US006689472B2

United States Patent
Järvenkylä et al.

(10) Patent No.: US 6,689,472 B2
(45) Date of Patent: Feb. 10, 2004

(54) APPARATUS FOR EXTRUSION OF POLYMERS AND PLASTIC PRODUCTS FORMED WITH THE APPARATUS

(75) Inventors: Jyri Järvenkylä, Hollola (FI); Kari Kirjavainen, Espoo (FI); Michael Sjöberg, Västerås (SE)

(73) Assignee: Uponor Innovation AB, Fristad (SE)

(*) Notice: Subject to any disclaimer, the term of this patent is extended or adjusted under 35 U.S.C. 154(b) by 48 days.

(21) Appl. No.: 09/942,109

(22) Filed: Aug. 28, 2001

(65) Prior Publication Data
US 2002/0047226 A1 Apr. 25, 2002

Related U.S. Application Data

(62) Division of application No. 09/142,113, filed as application No. PCT/FI97/00180 on Mar. 19, 1997, now Pat. No. 6,309,574.

(30) Foreign Application Priority Data

| Apr. 4, 1996 | (FI) | ................................................ 961540 |
| Apr. 29, 1996 | (FI) | ................................................ 961822 |
| May 8, 1996 | (WO) | ............................... PCT/FI96/00261 |
| Sep. 20, 1996 | (WO) | ............................... PCT/FI96/00502 |
| Dec. 12, 1996 | (FI) | ................................................ 964988 |
| Dec. 12, 1996 | (FI) | ................................................ 964991 |
| Dec. 20, 1996 | (FI) | ................................................ 965182 |

(51) Int. Cl.$^7$ ............................................... B32B 27/32

(52) U.S. Cl. ............................... 428/411.1; 428/475.8; 428/476.1; 428/476.3; 428/476.9; 428/516; 428/523

(58) Field of Search .......................... 428/411.1, 475.8, 428/476.1, 476.3, 476.9, 516, 515, 523

(56) References Cited

U.S. PATENT DOCUMENTS

| 3,008,187 A | 11/1961 | Slade |
| 3,314,108 A | 4/1967 | Wienand et al. ................ 18/12 |
| 3,712,783 A | 1/1973 | Maxwell .................. 425/381.2 |

(List continued on next page.)

FOREIGN PATENT DOCUMENTS

| DE | 2558238 | 7/1977 |
| DE | 4428867 | 2/1996 |
| EP | 0422042 | 12/1989 |
| EP | 0641825 | 3/1995 |

(List continued on next page.)

OTHER PUBLICATIONS

Abstract of JP 3–97737 of Apr. 1991.
Plastic Engineering Handbook, 4th Edition, Joel Frados, ed., Van Nostrand Reinhold, (1976) pp 156–167.

*Primary Examiner*—D. S. Nakarani
(74) *Attorney, Agent, or Firm*—Ladas & Parry

(57) ABSTRACT

An apparatus for manufacturing an extruded plastic product, the apparatus including at least one rotor and at least one stator defining a clearance having a feed gap between them, the rotor and stator collectively including a groove for moving material to be extruded from a feed zone of the apparatus to a shear zone of the apparatus upon rotation of the rotor and a countergroove for facilitating the extrusion of the material, the groove and countergroove being disposed on opposite sides of the feed gap, the countergroove having a thread that is opposite in direction to a thread of the groove, the groove having a cross-section that is substantially unchanging, the countergroove being disposed substantially along an entire length of the shear zone, the groove, countergroove and clearance forming a processing cavity having a volume that is the volumes of grooves, countergrooves and the clearance, the processing cavity having a cross-sectional area that decreases continuously along at least a part of an axis of the apparatus.

9 Claims, 4 Drawing Sheets

U.S. PATENT DOCUMENTS

| | | | |
|---|---|---|---|
| 4,125,333 A | 11/1978 | Fields | 366/79 |
| 4,410,482 A | 10/1983 | Subramanian | 264/515 |
| 4,462,692 A | 7/1984 | Meyer | 366/89 |
| 4,816,514 A | 3/1989 | Lutz | 525/55 |
| 4,876,051 A | 10/1989 | Campbell et al. | 264/127 |
| 5,387,386 A | 2/1995 | Kirjavainen | 264/173 |
| 5,449,484 A | 9/1995 | Gusik et al. | 264/211.23 |
| 5,505,887 A | 4/1996 | Zdrahala et al. | 264/127 |
| 5,518,676 A | 5/1996 | de Rocheprise | 264/127 |
| 5,700,885 A | 12/1997 | Pham et al. | 525/534 |
| 6,073,657 A | 6/2000 | Hippelainen et al. | 138/125 |

FOREIGN PATENT DOCUMENTS

| | | |
|---|---|---|
| EP | 0669374 | 8/1995 |
| EP | 0678069 | 11/1996 |
| GB | 2025839 | 1/1980 |
| JP | 397737 | 4/1991 |
| WO | 9519878 | 7/1995 |

APPARATUS FOR EXTRUSION OF POLYMERS AND PLASTIC PRODUCTS FORMED WITH THE APPARATUS

This application is a divisional of application Ser. No. 09/142,113 filed on December 7, 1998, now U.S. Pat. No. 6,309,574 which is International Application PCT/FI97/00180 filed on Mar. 19, 1997 and which designated the U.S., and was published in English, claims the benefit thereof and incorporates the same by reference.

BACKGROUND OF THE INVENTION

The invention relates to a method for manufacturing extrudable products, wherein the material to be extruded is fed in a powder, pellet or granulate form, by using one or more supply means, into a processing cavity consisting of the volumes of the grooves in the rotor, of the grooves in the stator and of the clearance between them.

The invention further relates to an apparatus for manufacturing an extruded plastic product, the apparatus comprising at least one rotor and at least one stator, and a feed gap between them, grooves being provided on the other side of the feed gap for pressing the material to be extruded out of the apparatus when the rotor is rotated, the cross-section of the groove being substantially unchanging, and a countergroove being provided on the other side of the feed gap at least over a distance of the gap, the thread of the countergroove being opposite in direction to the groove provided on the other side of the feed gap.

The invention also relates to a plastic product containing matrix plastic to which 1 to 30% of barrier plastic has been added.

FIELD OF INVENTION

It is very difficult to process plastics having a high molecular weight with a conventional extruder consisting of a long screw and a cylinder. The yield of the extruder remains very small, since temperatures easily rise too high due to heat generated by the friction. Polymers that are difficult to process include for example fluoroplastics and polyethylenes having a great molar mass and a molecular weight of over 200 000 g/mol, in very hard plastics even over 300 000 g/mol. There are a number of similar materials that are hard to process and they have in common a high molecular weight and therefore a low melt flow rate, a high melting point and in some cases a narrow processing window, in other words for example the decomposition temperature of the plastic is close to its melting point.

Extrusion is particularly difficult at low temperatures when the extrusion temperature is kept only a few dozen degrees above the crystalline melting point, i.e. the temperature is typically about 30 to 40° lower than normally in order that optional reactive components would not react too early. This situation is common especially when pipe grade chemically cross-linked pipes are produced. Problems occur since there are five different interconnected functions that are based on the action of the screw and that operate on the same axis and therefore at the same speed of rotation: feed, melting, mixing, homogenization and generation of pressure. In a conventional extruder, the screw is long and the ratio of the screw length to its diameter is most often about 20 to 30, and the screw comprises one, sometimes two or three, threads. The groove of the screw has been divided into different sections by varying the cross-section of the groove in the screw in such a way that the threads are often deep and positioned at long intervals from one another at the section where the supply takes place, and the cross-section is kept constant all the way in the melting zone but generally it is much bigger than at the outlet end. Thus, the material does not flow easily through the groove path and the end restriction causes a lot of frictional heat. In the mixing section the groove often has its own geometry, and in the end the groove becomes shallower and the generation of pressure begins. By means of this pressure a mass can be pressed even through a complicated tool. On the other hand, in a conventional extruder the total length of the groove around the screw is too long, in which case the ratio of the length of the groove to its cross-section becomes too great and it is therefore totally unsuitable for poorly flowable plastics.

U.S. Pat. No. 3,314,108 discloses an extruder comprising a conical rotor and conical stators provided in the exterior and interior of the rotor. The rotor comprises flat rectangular grooves for pressing the material to be extruded out of the extruder by rotating the rotor. However, with the aforementioned apparatus it is very difficult to process materials that are not easily workable. Also, the capacity will be limited.

EP 422,042 discloses an extruder comprising several conical stators and several conical rotors situated between them. The rotors and/or the stators are provided with calotte-shaped grooves for pressing the material to be extruded out of the extruder when the rotors are rotated. With this apparatus it is possible to manufacture very advantageously multilayer plastic pipes, but the processing of materials that are not easily workable creates a problem. Further, in the apparatus the moulding pressure is generated at the output end and the yield of the apparatus is therefore not entirely sufficiently good. Also, the material to be extruded is melted with heat that is provided from the outside, and it is therefore difficult to control the temperature, and the consumption of energy is relatively great.

U.S. Pat. No. 4,125,333 discloses an extruder comprising a long screw with threads, and a stator situated outside the screw and having same-handed threads. The same-handed threads of the stator produce a backflow, whereupon the material is mixed and the amount of heat generated by the friction easily increases to an uncontrolled level.

DE 2,558,238 also discloses an extruder comprising at its end a mixing section with either same-handed, opposite or direct grooves in the stator. Such an apparatus mixes the material very effectively, but it cannot be applied at all in equipment where the temperature of the material is to be adjusted accurately, since the amount of heat generated by the friction easily increases too much.

U.S. Pat. No. 3,712,783 discloses an extruder comprising a diverging feed zone. After the feed zone the material is pumped into a restriction zone. Thereafter the mass is pumped and caused to be extruded through an outlet. The structure of the apparatus is very complicated. The structure of the apparatus causes very high friction and because the extrusion pressure is raised near the outlet, the yield of the apparatus is very poor.

EP 0,678,069 discloses extruding multilayer pipes made of cross-linked polyethylene. The first step comprises extruding the centre layer of the pipe and thereafter the centre layer is coated with skins. The skins are used only for improving the flow characteristics of the pipe when the pipe is passing the heating tool. A special disadvantage of the apparatus is the need for a tool having spider legs, because the spider legs cause weld lines.

SUMMARY OF THE INVENTION

The purpose of the present invention is to provide a method and an apparatus with which it is relatively easy to also extrude poorly workable materials into a plastic product, and a plastic product with excellent properties.

The method according to the invention is characterized in that the cross-sectional area of said cavity decreases at least partially continuously along the axis of the extruder, and by the relative rotational movement of the stator and the rotor said material is forced to proceed along an x-axis, whereby the frictional heat caused by the shear melts a part of the material forming a bed consisting of mainly unmelted particles and some melt around them, enabling the formation of a processing cavity that is completely filled at a certain cross-section at a distance from the end of the apparatus, end hence a rise in the pressure to a level higher than needed for pushing the material through a die later on along the x-axis.

Also, the apparatus according to the invention is characterized in that after the feed section there is a shear zone, the countergroove being positioned substantially along the entire length of the shear zone, and that the cross-sectional area of the processing cavity, consisting of the volumes of the grooves in the rotor, of the grooves in the stator and of the clearance between them, decreases at least partially continuously along the axis of the extruder.

Further, the product according to the invention is characterized in that the barrier plastic is positioned in the product in such a way that it forms a laminar structure.

The essential idea of the invention is that the material is extruded in a processing cavity that consists of the grooves of the rotor and the stator and of the clearance provided between them, and that the volume of this cavity decreases at least partly in the axial direction, so that the material is forced in the axial direction to a smaller cross-sectional space, whereupon the heat generated by the friction resulting from the shearing melts the material at least partly, which results in an increase in the pressure already a distance before the end of the apparatus. Further, it is essential in the invention that plastic can be processed to such a small extent that at the orifice of the extruder, if there is no heating means, the mass flow contains particles that have not melted completely. For example in polyethylene such particles are visible as lighter particles in the transparent mass. According to tests that have been conducted, the unmelted particles do not impair the properties of the product in any way. Most preferably, at least a part of the flight of the countergroove matches every flight of the grooves provided on the other side of the feed gap, in which case the countergroove is narrower than the flights between the grooves provided on the other side of the feed gap. The idea of a preferred embodiment is that the width of the countergroove is about 30 to 50% smaller than the width of the groove provided on the other side of the feed gap. The idea of another preferred embodiment is that the gradient of the countergroove is about half of the gradient of the groove provided on the other side of the feed gap. The idea of a third preferred embodiment is that the size of the countergroove or the volume of the processing cavity varies in such a way that the ratio of the cross-sectional area of the initial part of the groove to the cross-sectional area of the final part thereof approximately equals the ratio of the density of the solid mass to the bulk density of the mass to be extruded. The idea of a fourth preferred embodiment is that the feed gap is annular and decreases evenly in diameter, i.e. it has a conical form, at least over a distance of its length, so that the diameter of the feed gap at the end where material is fed is greater than its diameter closer to the material outlet end, and that the ratio of the diameter of the wider section of the cone to the diameter of the narrower section approximately equals the ratio of the density of the solid mass of the material to be extruded to the bulk density of the mass. The idea of a fifth preferred embodiment is that the groove supplying material has a substantially triangular or semicircular cross-section. Further, the ratio of the length of the extrusion screw to the greatest diameter of the screw is preferably equal to or less than about 10, for example. Most preferably the ratio for a cylindrical extruder is between 3 and 6. Also, in a prior art extruder the ratio of the groove length of the screw to the cross-sectional area of the groove is over 20 1/mm, whereas in the apparatus according to the invention, the ratio of the length of the groove to the cross-sectional area of the groove is less than 20 1/mm.

The invention has the advantage that the melting and homogenization of the mass require as little deformation energy as possible. When the pressure is raised sufficiently high at a relatively early stage, the yield of the apparatus can be improved substantially. It is possible to determine for an extruder a theoretical yield indicating the amount of ideal material the apparatus produces when the rotor rotates one round. In a prior art apparatus, the actual yield is rather low with respect to the theoretical maximum, typically about 10 to 15%. With the present apparatus, it possible to achieve as high a yield as 50% from the theoretical maximum yield by means of the countergrooves and the decreasing cross-sectional surface of the cavity. The unchanging cross-section of the melt-conveying groove does not force the plastic away from the area of the groove even in the final section of the groove. When a countergroove is provided on the other side of the feed gap, the flight between the supply grooves can be made wide since the countergroove grips the material to be extruded, which therefore travels effectively forward in the apparatus, i.e. the amount of wasted energy decreases essentially. When the flights of the countergrooves are positioned in such a way that they match the flights of the grooves on the other side of the feed gap, backflow is prevented effectively and the material is simultaneously made to rotate advantageously. With an apparatus provided with the screw geometry according to the invention, masses that would otherwise be difficult to process can also be extruded well. It is possible to process, for example, cross-linkable polyethylene having a molecular weight of over 200 000 g/mol and, in very tough plastics, as high as over 300 000 g/mol. Even with such materials the yield of the apparatus can be easily maintained for example over 100 kg/h, whereas the yield of a conventional piston (ram) extruder is typically about 25 kg/h, for example. When the countergroove or the processing volume or the feed gap is made to change in a ratio equalling the ratio of the density of the solid mass of the material to be extruded to the bulk density of the mass, air can be prevented from passing with the mass flow. Also, overfeeding will not result in such great overpressures that in conventional machines will lead to a breakdown or at least a runout of the torque. The flow of material in a substantially triangular or a semicircular groove is easy, temperature gradients are smaller and the rotating motion of the material within the groove cross-section is very effective. With a conical screw it is possible to shorten the total length of the groove of the screw and therefore to reduce the amount of heat generated by the friction caused by the flow. Further, the surface of a conical screw is typically about 50% greater than the surface of a screw of a conventional cylindrical extruder having an equal yield. This is very advantageous for mastering the need for cooling or heating. When round single-screw apparatuses are equipped with countergrooves, the extruder needs cooling in the feed zone because of excessive pressure and friction. The important improvement in the present apparatus is that no extra cooling is needed and the process is very stable and controllable. Nor is any extra cooling (cooling fans etc.) needed in the machine barrel despite the very high outputs that are achieved.

BRIEF DESCRIPTION OF THE DRAWINGS

The invention will be described in greater detail in the accompanying drawings, in which.

DETAILED DESCRIPTION

Figure 1:
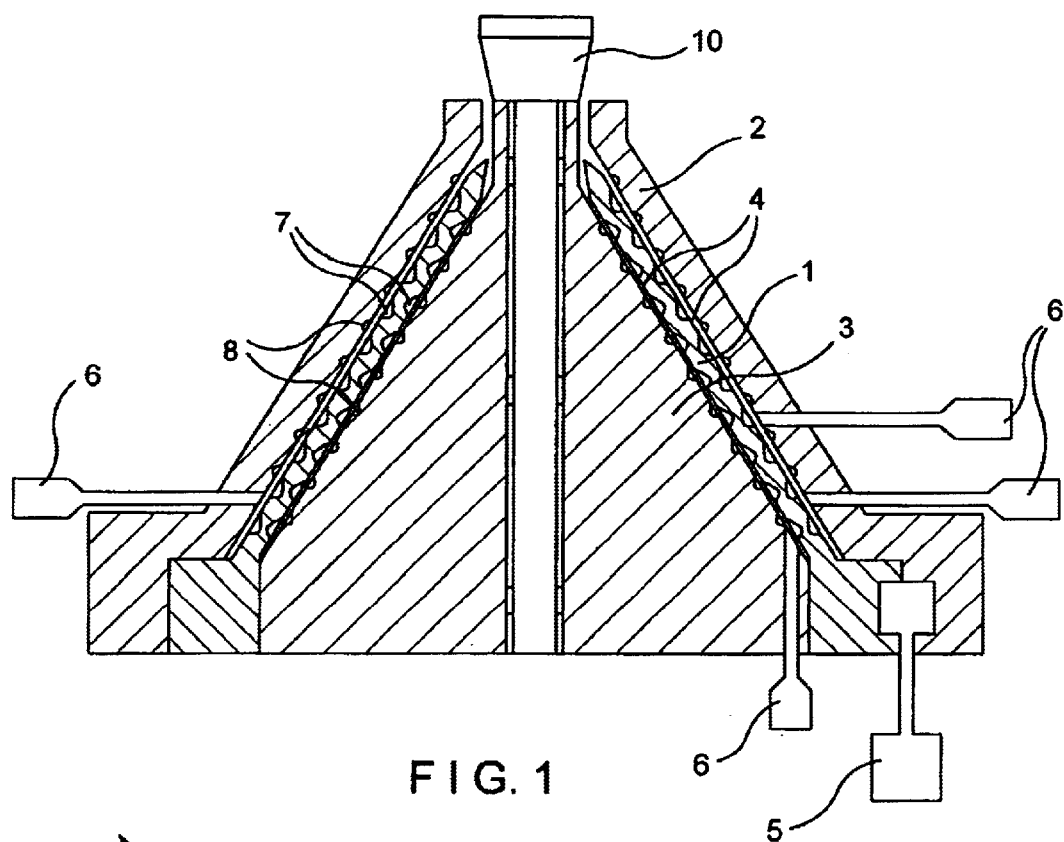
FIG. 1 shows schematically a cross-sectional side view of an apparatus according to the invention.

FIG. 1 shows an extruder comprising a conical rotatable rotor 1, a conical outer stator 2 provided outside the rotor and a conical inner stator 3 situated inside the rotor. Between the rotor 1 and the stators 2 and 3 there are annular, narrowing or conical feed gaps 4. The feed gaps 4 are shown in FIG. 1 considerably wider than they actually are for the sake of clarity. The rotor 1 is rotated with a rotating means 5 in a manner known per se. The apparatus further comprises supply means 6 for supplying the material to be extruded to the feed gap 4. The apparatus comprises several supply means 6 in such a way that the material can be supplied to a desired part of the feed gap 4, for example to the widest part of the rotor or to a narrower part of the rotor 1 closer to the output end. There may be more than one supply means also in the circumferential direction. The problem with a conventional extruder is that it is optimal only for one type of material and one yield. For example when an apparatus designed for, powder is used for granulate, the yield decreases clearly, typically at least 30%, but often as much as 50%. On the other hand, if the screw is designed for a yield of 500 kg/h, it operates very poorly if the rate of extrusion is to be maintained at a level of 200 kg/h. The apparatus according to the invention can comprise several supply means due to the fact that if the bulk density of the plastic to be extruded is greater than the density the screw has been designed for, the optimum result can still be achieved simply by supplying the material to the feed gap 4 with the supply means situated closer to the output end.

The rotor 1 comprises grooves 7, i. e. screw recesses, which move the material to be extruded out of the extruder when the rotor 1 is rotated. On the other side of the feed gap 4, i.e. in the stators 2 and 3, there are countergrooves 8. The countergrooves 8 facilitate the extrusion of otherwise poorly workable material through the extruder. The threads of the countergrooves 8 are made opposite in direction to the grooves 7 of the rotor 1. When the countergrooves 8 are placed in the feed and shear zones, they create additional friction as the granulate or powder to be supplied sticks to the countergrooves 8, which is desirable at the beginning of the processing of the material. After the feed section, the countergrooves 8 grip the material to be extruded in such a way that it travels effectively forward in the extruder. Therefore, the countergrooves reduce the amount of wasted energy and make the material flow effectively without an excessive increase in the temperature. If the material to be extruded is such that it does not stick for example to the smooth stator by the action of the friction, the material can be made to flow effectively through the extruder even at a low temperature by means of the countergrooves 8. A suitable level of friction can also be provided by selecting the correct coating agents for the rotor and stator. The stator is preferably coated with nanoceramic coating materials or for example synthetic diamond (DLC). The rotor is preferably coated with a material with low friction, such as black nitration or chrome-PTFE-plating, as disclosed in another patent application of the Applicant, PCT/EP96/02801, which is incorporated herein by reference for all purposes.

When an apparatus is provided with the aforementioned advantageous coating having excellent abrasion resistance, a softer material that therefore conducts heat better, for example beryllium bronze having more than fivefold thermal conductivity compared to tool steel, can be used in the rotor and/or the stator. If the apparatus is conical, the short structure of the apparatus provides the advantage that heat can be conducted effectively from the output end of the apparatus to the colder area in the initial section where the apparatus can be cooled in order to prevent the material from melting too early. In such a case, the mass flow can be provided with a more advantageous temperature gradient than in a conventional extruder. The conical form is also advantageous since the ratio of the screw length to its largest diameter is advantageous in such a way that the fastening provided with bearings can be made firm by placing the bearing arrangement for example in the widest part of the extruder, and the screw does not exhibit considerable deflections so that for example metal-to-metal contact is totally prevented, which is not the case in conventional cylindrical extruders.

For plastics having a high molecular weight, the weld line is the weak spot. Therefore, this screw having an inside hole provides the possibility of increasing the strength of the product clearly since the tool can be attached to the frame of the extruder without a spider leg. FIG. 1 shows a mandrel 10 that is placed in an opening situated inside the inner stator 3 and that is supported on the inner stator 3. In this manner the mandrel 10 remains tightly in place even if no spider legs are used, and the material can be supplied to the mandrel 10 without splitting it in any part of the extruder. Especially in this method where unmelted particles are allowed to merge out of the device, spider legs would cause very weak seams.

The cross-section of the grooves 7 in the rotor 1 remains substantially unchanged from the feed section to the end of the screw. In this manner, the deformation energy consumed by the melting and homogenization of the materials can be kept as small as possible. In the apparatus according to the invention, the pressure of the material to be extruded is preferably generated at the very beginning of the shear zone and it is thereafter maintained at a substantially constant level. If the diameter of the rotor is at the maximum for example about 400 mm and at the minimum about 200 mm, the rotor then comprises typically about 20 grooves having a width of 6 mm. The yield of such an apparatus is typically about 300 kg/h. What is very surprising is that the output and quality of the extrudate can be maintained good on a variety of materials. It can be said in a way that a conical extruder comprises several conventional cylindrical extruders connected in parallel. In such a case, the flow can be controlled better. It has been found in tests that the variation in the residence time of the material is smaller than in normal extruders. This is particularly important in reactive extrusion wherein for example peroxide has been mixed with the plastic and the residence time must be short and the distribution must be narrow to prevent cross-linking inside the extruder. Further, such small grooves provide orientation of the molecules in the direction of the groove, whereupon the friction of the material in the groove decreases. Also, the contact surface between the apparatus and the plastic is great and heat exchange is very effective. For example with the average residence time of a conventional extruder, the heat-transfer surface with which the plastic comes into contact in a conical apparatus is more than double in a well designed case. This means that the temperature of plastics that are hard to process can be controlled far more effectively by means of cooling or heating.

When the apparatus according to the invention is used to process a material, the density of the material changes as it passes from the supply means to the end of the screw. This is due to the fact that the material is supplied to the apparatus mostly in the form of powder or granulate. The density is then usually 20 to 80% of the density of solid material. Therefore, the porosity of the product and the low yield often constitute problems. Since the apparatus shown in FIG. 1 is conical, the circumferential speed of the rotor 1 changes in such a way that it is higher in the feed section than near the output nozzle. The ratio of the diameter of the rotor's 1 initial section to the diameter of its final section preferably equals the ratio of the density of the solid mass of the material to be extruded to the bulk density of the material. In other words, the initial section of the rotor 1 typically has a diameter that is 1.25 to 5 times greater than the diameter of the final section of the rotor 1, the ratio being most preferably about 2.

If the apparatus were not conical, an almost similar effect to the one described in the preceding paragraph could be provided in such a way that the size of the cross-section of the countergroove 8 would change between the final and initial sections of the apparatus so that the ratio of the cross-section of the beginning of the countergroove 8 to the cross-section of the end of the countergroove would approximately equal the ratio of the density of the solid mass of the material to be extruded to the bulk density of the material.

In apparatuses according to the invention, the feed section is in the axial direction as wide as the diameter of the feed gap. The length of the shear zone starting after the feed section can be defined in the axial direction by measuring with a pressure sensor when the groove is full of material. After the shear zone there is a homogenization and mixing zone that extends to the end of the apparatus. A separate pressure-increasing zone is not needed since material is melted in the shear zone to a small extent and the pressure is increased simultaneously. The apparatus can create a pressure that equals the pressure loss of the tool already in the shear zone.

After the shear zone, the direction of the countergroove 8 is preferably changed, i.e. the grooves are same-handed so that they increase the effectiveness of the mixing. The apparatus may be in this area either conical or cylindrical. Further, the opposite surface may be provided in this area with for example overlapping semi-spherical notches that improve homogezination, as disclosed in another patent application of the Applicant, PCT/FI196/00658, which is incorporated herein by reference for all purposes.

It has been found out in the tests conducted that a conventional extruder, which has for example direct grooves in the feed section, is easily overfed, so that a pressure as high as 1000 bar can be measured from the apparatus. In the invention, the decreasing processing volume together with the decreasing shear rate results in the rapid formation of a plug that consists of partly unmelted material and particles, so that material must flow faster out in the groove, and since the cross-section of the groove itself is preferably constant, material can flow very rapidly and effectively out of the apparatus and the occurrence of a pressure that would be too high is prevented inside the apparatus. It was found out in the tests that it was almost impossible to create a pressure that would break the machine or lead to a critical torque in an apparatus according to the invention. Further, since the total distance is short in an extruder according to the invention, the counterpressure cannot rise. As a result, when the speed of rotation was increased, it was possible to detect a decrease in the temperature of the material, in other words the machine provides a very wide processing window specifically for cross-linking purposes since the range of the speed of rotation where it is possible to create a constant counterpressure by changing the ratios of the screw and the forced feed is considerably wide.

Figure 2:
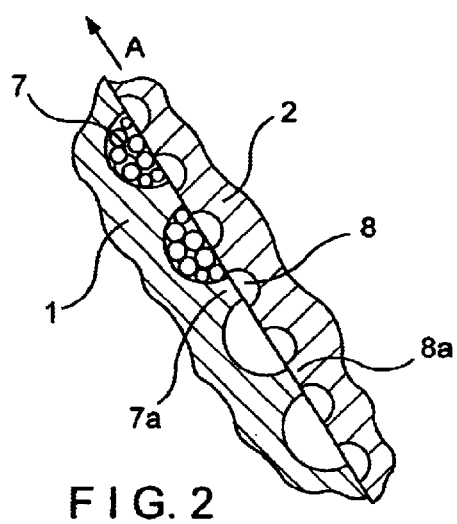
FIG. 2 shows schematically a cross-sectional side view of a detail of another apparatus according to the invention.

FIG. 2 is a cross-sectional side view of a detail of another apparatus according to the invention. The reference numerals of FIG. 2 correspond to those of FIG. 1. Flights 8a situated between the countergrooves 8 are designed to be placed in such a way that substantially in every place in the direction of the feed gap, i.e. for example in FIG. 2 in the direction of the arrow A, at least a part of the flight 8a of the countergroove 8 matches every other flight 7a of the rotor grooves 7. In such a case, the backflow can only reach past the flight 7a of at most one rotor groove 7.

FIG. 2 shows, by way of an example, material to be extruded in the two uppermost grooves. These two grooves represent the shear zone where a small part of the plastic material is melted by means of the shear force, and the pressure is simultaneously increased. The aim is to melt as rapidly as possible. by means of frictional force, only such an amount of material that it is possible to raise the pressure, which takes place fast when the material is compact, i.e. it has melted at least from the surface. Surprisingly, the proportion of the molten material should only be in the range of about 10%. The groove situated close to reference numeral 1 is filled with dry powder. Hence, there will be no pressure signal. On the other hand, the groove situated close to reference numeral 7 is filled with powder granules an some melted plastic, which is enough for pressure generation. The essential feature of the invention is that the pressure is generated very early in the screw, and as this pressure is high enough to overcome the pressure loss over the tool much further on in the screw direction, the material is swiftly conveyed through the groove channels.

Figure 3:
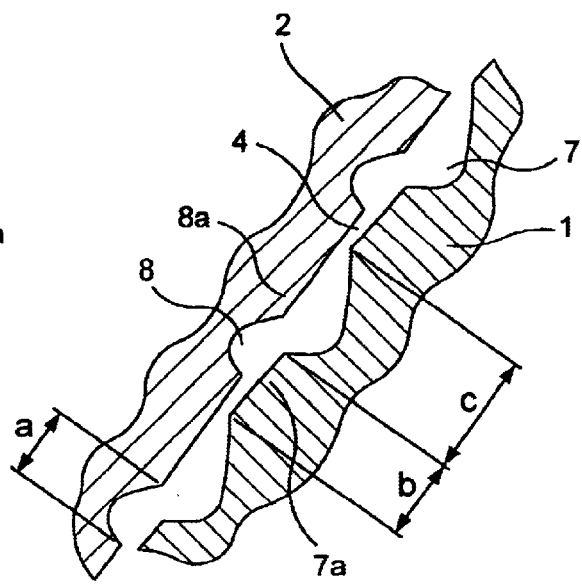
FIG. 3 shows a detail of the apparatus shown in FIG. 1.

FIG. 3 shows a detail of the apparatus of FIG. 1. The reference numerals in FIG. 3 correspond to those in FIGS. 1 and 2. The feed gap 4 is shown wider than it actually is for the sake of clarity. The width a of the countergrooves 8 is smaller than the width b of the flights 7a between the grooves 7. Backflow is thus prevented very effectively. However, despite their narrow shape the countergrooves 8 effectively help the material to be extruded move forward in the extrusion apparatus. The width a of the countergroove 8 is preferably about 30 to 50% smaller than the width c of the grooves 7. The thread of the countergrooves 8 is opposite in direction to the thread of the grooves 7 in the rotor 1. The gradient of the countergrooves 8 is about 1 to 90°, most preferably about half of the corresponding gradient of the grooves 7 in the rotor 1. If the gradient is 90°, this direct groove improves the forward supply of the material during normal use. The apparatus of the invention can be used as a plasticizing unit of an injection press and when the forward flow of the material is prevented in the injection end for example by means of a piston, the rotor 1 can still be rotated continuously since the material to be moulded can flow backwards in the apparatus along the direct grooves and the pressure of the material cannot rise too high near the output end of the apparatus. In absolute terms, very suitable gradients for a counterlgroove vary from 3 to 100°. The number of the countergrooves 8 is preferably bigger than the number of the grooves 7 in the rotor 1. It has been found out in tests that when the cross-section of the rotor grooves 7 remains essentially the same, there is substantially no material to be extruded between the stator and the flight 7a situated between the grooves, even though the gap were sufficiently large, for example about 0.4 mm.

The cross-section of the grooves 7 is preferably substantially triangular in such a way that one side of the triangle is mainly axial in direction and the other side is substantially perpendicular with respect to it, as shown in FIG. 3. Material flows easily and temperature gradients are smaller in a groove with a substantially triangular shape. In the groove, the material flows forward and rotates simultaneously, and this improved rotational flow also reduces substantially the uncontrolled formation of heat generated by the friction.

The flights 7a situated between the grooves 7 in the rotor 1 can be made sloping in such a way that the gap between the rotor 1 and the stator 2 is greater at the front edge of the flight 7a than at the rear edge of the flight 7a. The flight 7a is then subjected to a pressure function due to which the axial flow is not significant. The detailed design of the preferred embodiment of the groove flights is shown in a co-pending application by the Applicant, FI-964988, which is incorporated herein by reference for all purposes.

Figure 4:
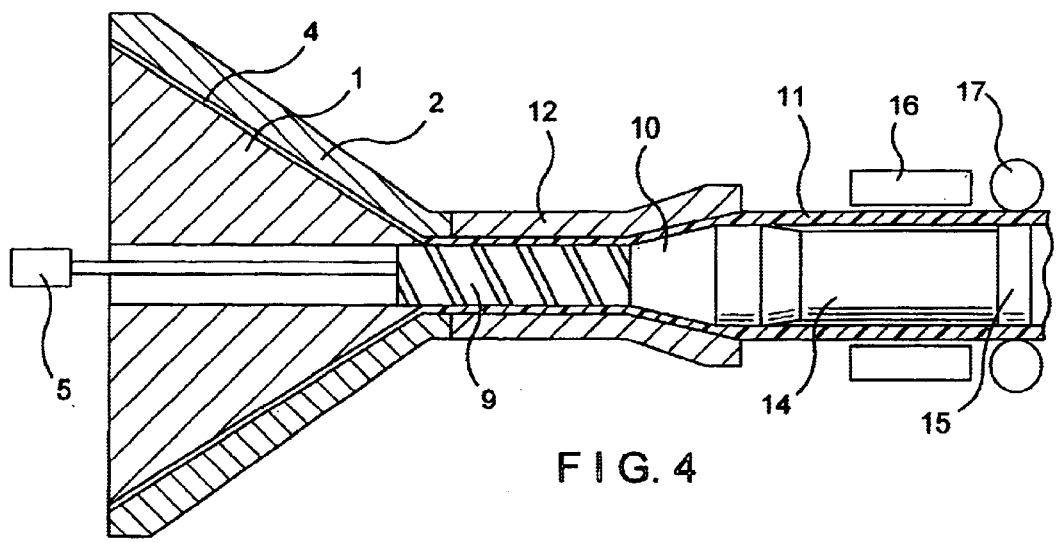
FIG. 4 shows schematically a cross-sectional side view of a third apparatus according to the invention.

FIG. 4 is a cross-sectional side view of another apparatus according to the invention. The reference numerals in FIG. 4 correspond to those in FIGS. 1 to 3. FIG. 4 shows only one feed gap 4 outside which there is a stator 2 and inside which there is a rotor 1. For the sake of clarity, the figure does not show supply means, a means for rotating the rotor 1, nor grooves. The interior of the rotor 1 comprises a conical screw 9 that is rotated with a rotation means 5. The end of the feed gap 4 is then tubular. After the screw 9 there may be an orientation mandrel 10 where the product 11 to be extruded is widened, which enables the production of oriented products 11. When ordinary non-oriented products 11 are manufactured, the cross-section is naturally not changed. The product 11 to be extruded may be for example a plastic pipe, a film or a cable sheath.

The conical rotor 1 can be easily moved in the axial direction so that the clearance of the feed gap 4 can be adjusted without difficulties. By adjusting the clearance it is possible to control the yield and the pressure generation capacity of the apparatus and the amount of the heat produced by the friction without changing the speed of rotation of the rotor 1. The screw 9 may also be movable in the axial direction so that the apparatus can be converted easily into an injection press. The yield of a normal piston extruder is typically about 25 kg/h, whereas an apparatus according to the invention easily provides a yield exceeding 200 kg/h. When the length of the cylindrical screw is varied in the axial direction, it is easy to optimize the pressure level that is only needed to press the mass through the tool. The screw 9 and the orientation mandrel 10 can be provided with associated ducts and small openings through which a lubricant and/or a cooling agent can be supplied. In such a case, the lubrication may be performed in the apparatus with for example molten plastic, and the cooling that takes place at the final section of the tool may be carried out with some other medium.

After the nozzle of the extruder outside the product 11, there may be a heating tool 12 that operates with oil or electricity, for example. For the purpose of cross-linkage, the part 12 may be manufactured especially preferably from quartz glass so that the part 12 is transparent and infrared heating can be used for the cross-linkage, as detailed in a co-pending application by the Applicant, PCT/SE96/01169, which is incorporated herein by reference for all purposes. The temperature of the product and the time the material is inside the heating tool, i.e. the residence time, can be adjusted for example by designing the length of the heating tool in such a way that the material can be heated sufficiently also with convection, for example. The temperature of the tool and the residence time of the material are adjusted to such a level that the output material is for the most part homogenized.

The aim with such an apparatus where the deformation energy remains small is that the plastic agglomerate particles are not necessarily melted entirely, but the friction work is maintained at a level where the particles are interconnected from the surface. Therefore it is possible to let mass with clearly unmelted particles pass through the extruder comprising no heating means. This process is called continuous sintering. Especially when cross-linked polyethylene having a high molecular weight is processed at a low temperature, i.e. for example in the range of 140 to 180° where peroxide does not react within reasonable time, unmelted particles are not significant for the properties of the final product, however, since according to the invention the extruder is connected to a heating unit where the temperature of the mass is rapidly raised to 250°, for example, whereupon the unmelted particles melt fully, i.e. the material flow is finally homogenized, and peroxide is decomposed rapidly.

As stated above, it is highly preferable in this process to support the mandrel 10 without a spider leg, since in such a case the material flow is not split at any stage. However, the use of a long mandrel 10 creates problems in the control of wall tolerances and the centering of the mandrel 10. For example a wall having a thickness of about 10 mm in a pipe with a diameter of 100 mm requires a heating tool that is more than 2 m in length. In such a case, the mandrel 10 bends easily and the centered position cannot be maintained. This problem can be eliminated by providing, at the end of the mandrel 10, a torsion bar 14 having a diameter that can be smaller than the greatest diameter of the mandrel 10 in order to reduce the friction. At the end of the torsion bar 14 there is a plug 15 that is made of a very slideable material, such as polytetrafluoroethylene, in the part situated against the product 11, so that the plug 15 slides easily against the inner wall of the product 11. When the plug 15 is extended for example to the interior of a cooling basin 16 or even further to a pulling device 17, if desired, the plug 15 rests against a wall that has already set. In such a case, the centering of the mandrel 10 in the area of the molten material can be adjusted easily to the exact correct position for example by deflecting the axial position of the pulling device 17. The long torsion bar 14 bends the mandrel 10 so that it is centred in the correct manner.

Figure 5:
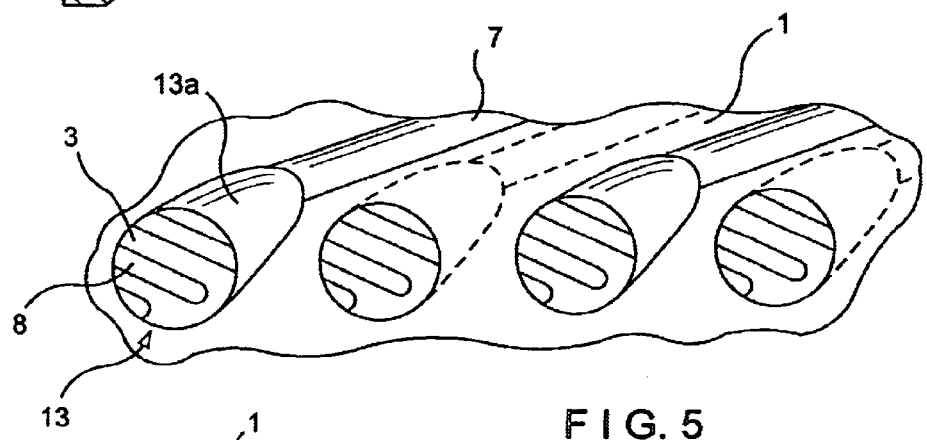
FIG. 5 is a side view of a part of a rotor in an apparatus according to the invention.

FIG. 5 is a side view of a part of a rotor 1 in an apparatus according to the invention. The reference numerals of FIG. 5 correspond to those of FIGS. 1 to 4. FIG. 5 shows the rotor 1 in the area of the material feed section. In the situation shown in FIG. 5, the material to be extruded is fed with one supply means both into the exterior and the interior of the rotor 1. At the supply means, the rotor 1 comprises feed gaps 13 through which some of the material can flow from the supply means to the interior of the rotor 1. The edges of the feed gaps 13 are provided with bevels 13a in such a way that every other bevel 13a is directed towards the outer circumference of the rotor 1 and every other towards its inner circumference. As the rotor 1 rotates, the supplied material thus moves through every other feed gap 13 to the exterior of the rotor 1 and through every other gap to the interior thereof. In such a manner, the bevels 13a ensure that the material to be supplied is distributed evenly to the exterior and interior of the rotor 1. In FIG. 5, the bevels 13a that channel material to the interior of the rotor 1 are illustrated by broken lines.

Figure 6:
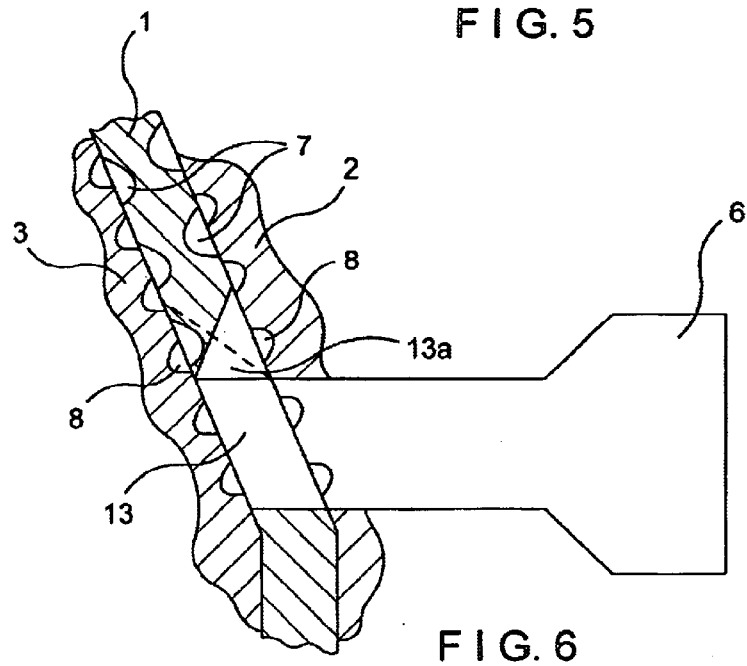
FIG. 6 is a cross-sectional view of the part of the rotor shown in FIG. 5.

FIG. 6 is a cross-sectional view of the rotor part shown in FIG. 5. The reference numerals in FIG. 6 correspond to those of FIGS. 1 to 5. The supply means 6 is most preferably a force feed screw that provides a sufficiently high pressure in the material to be supplied as it moves to the extrusion apparatus. By means of the force feed screw and the orientation of the bevels 13a of the feed gaps 13 alternately towards the exterior and the interior of the rotor 1, it is ensured that there is a sufficient amount of material to be extruded in the grooves 7, which in turn guarantees an effective and even yield of the extrusion apparatus. FIG. 6 illustrates with a broken line the bevel that channels material inwards from the feed gap 13 situated behind the point of cross-section. It is naturally not necessary to provide a hole in places where the bevel 13a is directed towards the outer circumference of the rotor 1, but it is sufficient that there is in such a place a cavity through which material can flow to the grooves situated outside the rotor.

Figure 7:
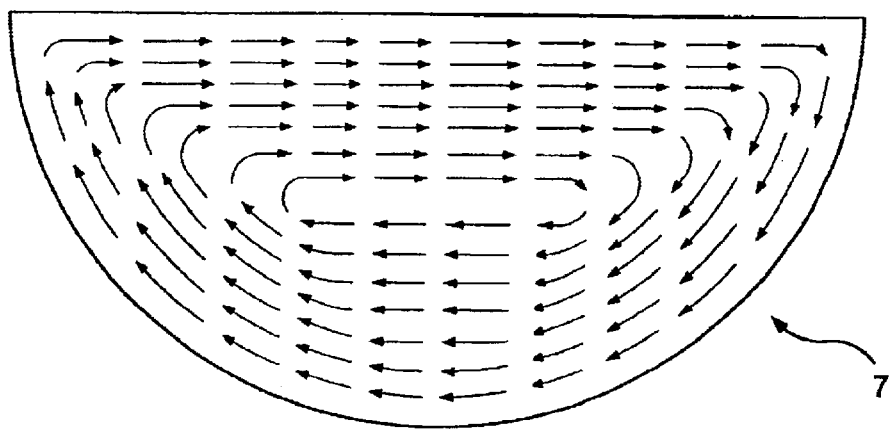
FIG. 7 shows schematically the movement of the material in a groove of the rotor.

FIG. 7 is a cross-sectional view of a groove of the rotor 1. In the case shown in FIG. 7, the cross-sectional shape of the groove is substantially semicircular. Due to the placement of the flights 7a of the grooves 7 of the rotor according to the invention and the flights 8a of the countergrooves 8, the material to be extruded remains in the groove 7 effectively and it is therefore made to move in a rotating manner. The semicircular shape shown in FIG. 7 is extremely advantageous for the rotating motion. The rotating movement of the material is illustrated by arrows in FIG. 7. The substantially triangular cross-sectional shape shown in FIG. 3 is also advantageous for the rotation of the material, i.e. the material is provided with a corresponding rotary motion as shown in FIG. 7 with arrows.

The rotational flow in the groove of the screw, resulting from the friction against the cylinder of a conventional extruder, creates a considerable temperature gradient in the groove. This unbalanced temperature is detrimental in two ways. Firstly, it disturbs the extrusion of agents that are sensitive to the temperature since it is clear that when the actual local temperature is for example 40° higher than the set temperature of the extruder, for instance in case of cross-linked polyethylene the result is a mass with locally cross-linked areas. When PVC is processed, local high temperatures cause thermal degradation of the mass. On the other hand, an uneven temperature makes the processing more difficult, since most plastics easily change their viscosity as a function of the temperature. For example in the shear rate range typical of polyethylene, an increase of 60° in the temperature decreases the viscosity from the value of 1000 Paxs to about a half. When the groove is provided with a semicircular or a triangular shape, the material flows more easily and the temperature gradients are smaller. The improved rotational flow also essentially reduces the uncontrolled generation of heat caused by the friction. The distance between the ridges of the groove of the screw in a conventional extruder approximately equals the diameter of the screw, which typically results in a width-to-height ratio of over 10 for the groove of the screw. However, when plastics with a high molecular weight are processed, the deformation energy must be as small as possible, i.e. there must be as little heat generated by the friction as possible. It is presumably more difficult to make material flow in a rotating manner in a shallow groove than for example in a semicircular or a triangular groove. The optimal ratio of the groove width to its depth is preferably between 2 and 7 for a conical extruder if rectangular grooves are used.

Figure 8:
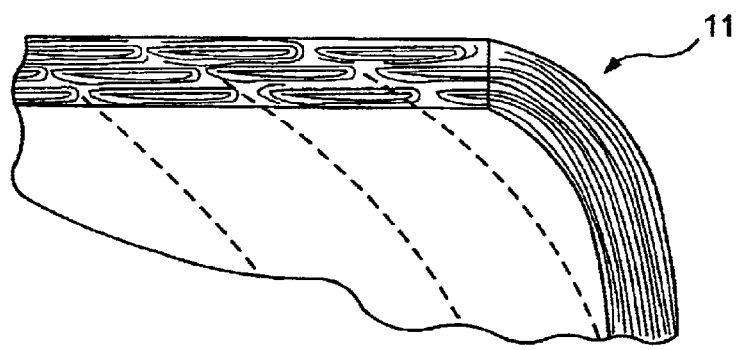
FIG. 8 shows schematically, from an oblique direction, a cross-section of a plastic pipe manufactured with an apparatus according to the invention.

FIG. 8 is a sectional view of a product according to the invention. Since rotational flow in a screw groove according to the invention is very easy, there are two benefits: the total friction between the stator and the rotor is much smaller than predicted, which is partly due to the countergrooves, as well, and the flowing and rotating material is provided with a laminar structure, i.e. the rod-shaped material passing in the groove is similar to paper wound on a roll. This results in a plastic pipe as shown in FIG. 8, for example, the section of the pipe showing dozens of transverse stripes that are caused by the rotational flow in the groove. More than 50 laminar layers can be detected from a wall having a thickness of preferably 4 mm, for example. The laminar structure of the pipe 11 is illustrated with thin lines in FIG. 8. This laminar structure provides considerably better impact strength values and substantially improved permeability values, especially if 1 to 30% of a barrier plastic, such as polyamide or LCP, has been added to the matrix plastic to be extruded. The laminar structure is provided most easily when the matrix plastic and the barrier plastic do not intermix but they have preferably good mutual adhesion. It has also been discovered that a barrier plastic has preferably greater viscosity at the same temperature. The barrier plastic used is preferably aliphatic polyketone (e.g. under the trade name Ketonex, manufactured by British Petroleum). The pipe 11 shown in FIG. 8 has been manufactured for example by extruding a mixture comprising 1% of polypropylene among the polyethylene.

When peroxides or azo compounds are used, lowmolecular compounds with an unpleasant taste and/or smell are formed within the plastic and they migrate to the surfaces of the polyethylene. During conventional manufacture, a pipe must therefore be rinsed or treated thermally before it can be used with foodstuffs. With the apparatus according to the invention, it is possible to manufacture a multilayer plastic product where the outer, thicker layer is made of cross-linked polyethylene and the inner layer is of a barrier plastic so that the rest products resulting from the cross-linking of the outer layer are prevented from migrating to the inner surface of the product by the barrier layer.

Figure 9:
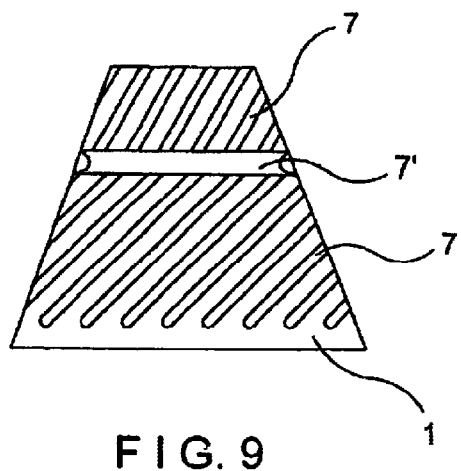
FIG. 9 shows schematically, in a side view, a rotor of an apparatus according to the invention.

FIG. 9 is a side view of a rotor of an apparatus according to the invention. The reference numerals in FIG. 9 correspond to those of FIGS. 1 to 8. The rotor 1 is provided with an intermediate groove 7' that is substantially perpendicular to the axial direction of the rotor. The intermediate groove 7' provides the additional homogenization of the material to be extruded. At the intermediate groove 7' the mass can travel a distance of a few grooves in the radial direction before it moves back to the grooves 7. The intermediate groove 7' can be placed either in the rotor or in the stator or in both. Especially in case of a cylindrical rotor 1. the volume of the countergrooves 8 preferably decreases up to the intermediate groove 7' and continues at a constant level after the intermediate groove 7'. The intermediate groove 7' is preferably placed in the axial direction of the extruder after the middle preferably at a point that is ⅔ of the length of the apparatus in the axial direction. The gradient of the rotor groove 7 can be changed easily after the intermediate groove 7'. When the gradient of the groove 7 is made more acute, it is easy to achieve the same yield as with an apparatus where the gradient would be kept constant, but when the gradient is made more acute the total amount of heat generated by the friction can be reduced as the length of the grooves decreases. According to the invention, the cross-section of the grooves 7 remains substantially unchanging, but the definition "substantially unchanging" also includes a case wherein the rotor and/or the stator comprise an intermediate groove 7' where the material particles are rearranged in order to provide homogeneity.

In the case shown in FIG. 9, the shear zone extends to the intermediate groove 7'. The mixing takes place in the intermediate groove 7' and the subsequent homogenization after the intermediate groove 7'.

Figure 10:
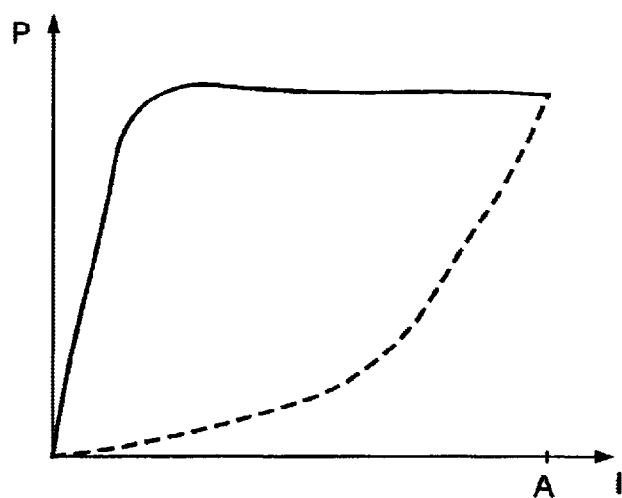
FIG. 10 shows schematically the pressure function of an apparatus according to the invention.

FIG. 10 shows the pressure function of an apparatus according to the invention with a solid line and the pressure function of a conventional extruder with a broken line. In a conventional extruder, the pressure P is increased at the end of the length I of the extruder, and therefore it is naturally the highest in point A, which represents the place of the nozzle of the apparatus. In the apparatus according to the invention, the pressure is increased inside the apparatus already at an early stage in the shear zone. At the end, the pressure may even fall towards the nozzle.

Figure 11:
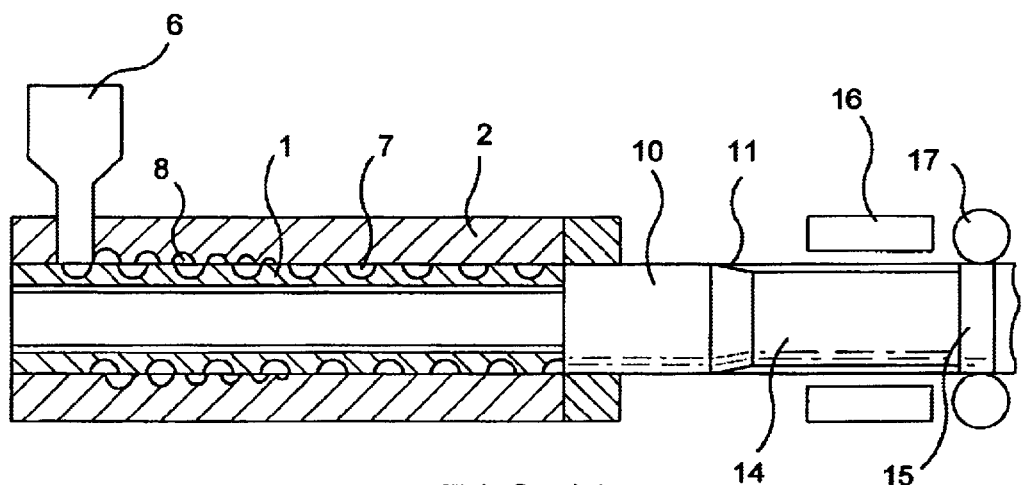
FIG. 11 shows schematically a cross-sectional side view of an apparatus according to the invention.

FIG. 11 is a partial cross-sectional side view of an extruder according to the invention. The reference numerals of FIG. 11 correspond to those of the preceding figures. Both the rotor 1 and the stator 2 are cylindrical. The rotor grooves 7 extend with substantially the same cross-section along the entire length of the rotor 1. The cross-section of the countergrooves 8 provided in the stator 2 decreases all the time. The countergrooves 8 extend approximately to the middle of the apparatus preferably at a point that is ⅓ of the length of the apparatus.

Figure 12:
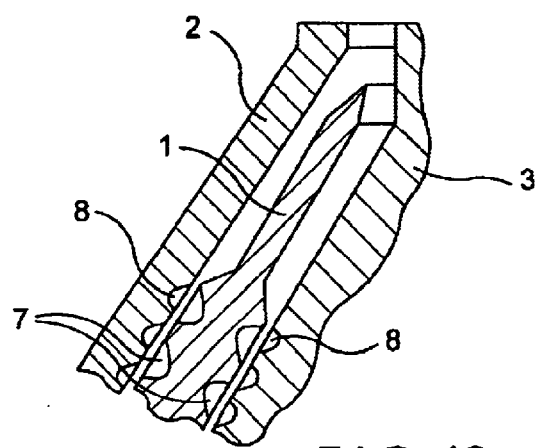
FIG. 12 shows schematically a cross-sectional side view of a part of yet another apparatus according to the invention.

FIG. 12 is a cross-sectional side view of a part of an apparatus according to the invention. The reference numerals of FIG. 12 correspond to those of the preceding figures. The rotor 1 and the stators 2 and 3 are conical. The rotor 1 is formed such that in the final section the clearance between the rotor 1 and the stators 2 and 3 grows substantially larger than what it is in the initial section. For example in the initial section, the clearance may be about 0.5 mm and at the end about 6 mm. Also, the grooves 7 and the countergrooves 8 end in the final section of the rotor and the material only flows in the aforementioned large clearance. In such a case, the speed of rotation of the rotor can be increased, since in the final section the shear rate acting on the material is low due to the great clearance. The yield then increases, i.e. it is possible to have a high yield even with a small apparatus. Also, at the end it is possible to provide an even shear field, so that the temperature of the material can be kept very even, which is extremely important in the processing of PEX, for example. This also makes it possible to start the cross-linkage already in the extruder, if desired. With this structure it is also possible to provide the product with a laminar structure that does not even comprise any of the elliptical parts shown in FIG. 8, but that is entirely laminar. The transmission equipment required is also smaller in size since the speed of rotation can be high, so that the moment can be smaller when the power remains constant. Further, the production tolerances of the apparatus may be substantially greater at the end of the rotor, i.e. the costs of manufacturing are decreased. Preferably, the thinner part of the rotor 1 is at least half of the length of the rotor; most preferably the direct section constitutes as much as ⅔ of the length of the rotor. The countergrooves 8 of the stator are made to extend to the point where the rotor is narrowed, i.e. the clearance is increased. The purpose of the rotor narrowing may also be the generation of orientation, and the rotor may also comprise openings through which material can flow; in other words, the structure of the final section of the rotor may be similar to that disclosed in a patent application of the Applicant, PCT /FI96/00261, which is incorporated herein by reference for all purposes.

The drawings and the description related thereto are only intended to illustrate the inventive idea. The details of the invention may vary within the scope of the claims. Therefore, for example the term "conical" also includes the shapes of parabola and hyperbola or a structure where the initial section has a shape of a tapering cone and the final section has a cylindrical shape. Also, the apparatus may comprise several rotors and/or stators. Further, the rotor may be placed outside the stator, if desired.

What is claimed is:

1. A plastic product comprising a matrix plastic and 1 to 30% of a second plastic, the second plastic being disposed in the product as a laminar structure having a shape of a flattened roll.

2. A plastic product according to claim 1, wherein the matrix plastic is polyethylene and the second plastic is a polyamide that is weldable with the polyethylene.

3. A plastic product according to claim 1, wherein the matrix plastic is polyethylene and the second plastic is polypropylene.

4. A plastic product according to claim 1, wherein the second plastic is an aliphatic polyketone.

5. A plastic product according to claim 4, wherein the matrix plastic is cross-linked polyethylene.

6. A plastic product according to claim 1, wherein the matrix plastic and the second plastic do not intermix.

7. A plastic product according to claim 1, wherein the second plastic has a viscosity that is greater than a viscosity of the matrix plastic.

8. A plastic product according to claim 1, wherein the second plastic is selected from the group consisting of a polyamide, an aliphatic polyketone, propylene and LCP.

9. A plastic product according to claim 8, wherein the matrix plastic is crosslinked polyethylene.

\* \* \* \* \*